United States Patent [19]

Nakamura

[11] 4,318,034

[45] Mar. 2, 1982

[54] BEAM CURRENT CONTROL CIRCUIT

[75] Inventor: Takashi Nakamura, Hatano, Japan

[73] Assignee: Sony Corporation, Tokyo, Japan

[21] Appl. No.: 178,385

[22] Filed: Aug. 15, 1980

[30] Foreign Application Priority Data

Aug. 16, 1979 [JP] Japan .................................. 54-104225

[51] Int. Cl.³ .............................................. H01J 29/52
[52] U.S. Cl. ...................................... 315/383; 358/243
[58] Field of Search ............................ 315/383, 30, 10;
358/243

[56] References Cited

U.S. PATENT DOCUMENTS 3,975,657  6/1981  Sato et al. ............................ 315/10

Primary Examiner—Theodore M. Blum
Attorney, Agent, or Firm—Hill, Van Santen, Steadman, Chiara & Simpson

[57] ABSTRACT

A beam amount of a diode gun type pick-up tube is controlled in response to an incident light amount. Such beam control is carried out by making an excess beam amount constant. The calculation of the excess beam amount is done by subtracting a control electrode current and a signal current from a cathode current in case of the diode gun type pick-up tube.

3 Claims, 1 Drawing Figure

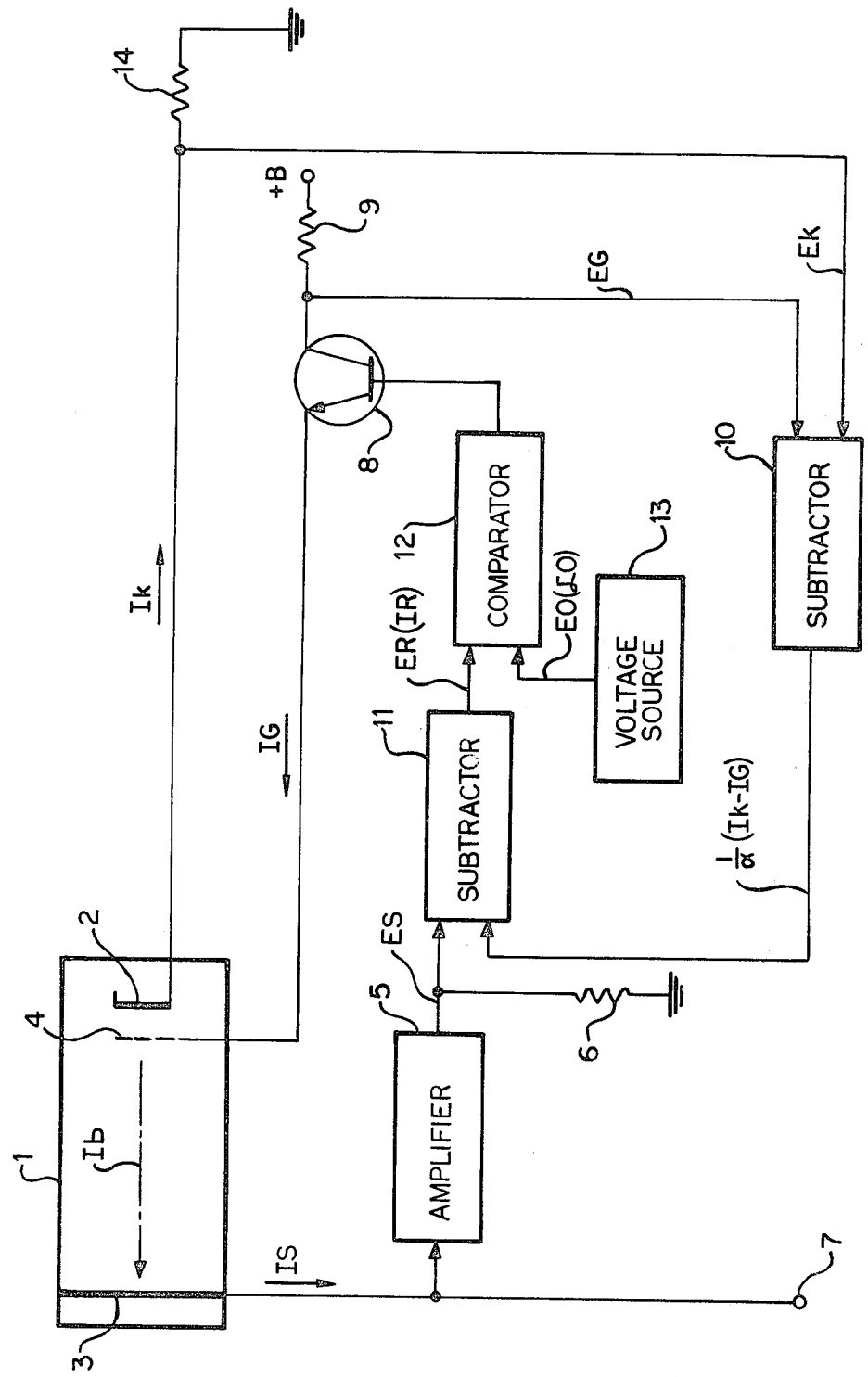

BEAM CURRENT CONTROL CIRCUIT

BACKGROUND OF THE INVENTION

1. Field of the Invention

This invention relates to a beam control circuit to be applied to an image pick-up tube, and particularly to a beam current control circuit for a pick-up tube having a diode gun.

2. Description of the Prior Art

It is known that there are two types of image pick-up tubes, in which a triode gun type image pick-up tube operates with lower control electrode potential than cathode electrode potential, while a diode gun type image pick-up tube operates with higher control electrode potential than cathode electrode potential.

Namely, when the image pick-up tube having a triode gun is in operation, a negative potential bias of $+30V \sim -100V$ is supplied to a control electrode relative to a cathode potential bias of about zero volts. On the other hand, when the image pick-up tube having a diode gun is in operation, a positive potential bias of $+10V \sim +20V$ is supplied to a control electrode relative to the cathode potential bias of about zero volts.

Accordingly, in case of the image pick-up tube having the diode gun, there flows a control electrode current under operating condition, while there flows no control electrode current in case of the image pick-up tube having the triode gun.

As shown in U.S. Pat. No. 3,975,657, a beam control circuit applied to the image pick-up tube having the triode electron gun by using an excess beam control technique is known. As described in the above-mentioned U.S. Pat. No. 3,975,657, a beam current of the amount of a pick-up tube has to be dynamically controlled in response to an incident light amount in order to maintain high resolution image.

The idea proposed in the above-mentioned U.S. patent is to keep an excess beam current (which can also be referred to as a return beam current) constant in any event. But this patent only describes such control circuit for the image pick-up tube having a triode gun.

DESCRIPTION OF THE PREFERRED EMBODIMENT

The single FIGURE of the drawing shows a beam current control circuit, wherein a reference numeral 1 designates an image pick-up tube having a diode type electron gun.

An electron beam Ib departed from a cathode electrode 2 lands on a photo sensitive layer 3, while the magnitude of the beam current Ib is controlled by a bias potential applied to a control electrode 4.

An output signal current Is from the photo sensitive layer 3 is amplified at a buffer amplifier 5, and then converted into an output signal voltage Es by a resistor b. Of course, the output signal current Is is also derived through a signal output terminal 7 for a video signal processing.

IN a current path for a control electrode current IG, there is proivded a control transistor 8, and a DC operating voltage +B is supplied to a collector electrode of this transistor 8 through a resistor 9.

The control electrode current IG is converted into a potential form at the resistor 8, then supplied to a subtractor 10, wherein a potential EK corresponding to a cathode current IK and the converted control electrode current IG are compared.

Namely, an output from the subtractor 10 is expressed as $$\frac{1}{\alpha}(IK - IG).$$

$\alpha$: constant

Further, thus obtained signal $$\frac{1}{\alpha}(IK - IG)$$

and previously explained signal Es are compared at a subtractor 11, and from which a signal ER, corresponding to a signal current IR is obtained, wherein the current IR (return beam current) is, expressed as $$\frac{1}{\alpha}(IK - IG) - Is.$$

Further, another comparator 12 is provided for comparing the signal ER with a reference voltage EO, and an output from the comparator 12 controls the control transistor 8. Such reference voltage EO is supplied from the reference voltage source 13. A reference numeral 14 designates a resistor for converting the cathode current IK into the signal voltage EK.

Under these circumstances, following relations are established:

$$IK - IG = \alpha Ib \quad (1)$$

$$IR + Is = Ib \quad (2)$$

$$Gm \times EG = Ib \quad (3)$$

wherein
IR: excess beam current (return beam current)
GM: mutual conductance
$\alpha$: constant From the equations (1) and (2), the excess beam current IR is calculated as $$IR = \frac{IK - IG}{\alpha} - Is \quad (4)$$

Namely, the excess beam current IR can be obtained by making linear relations among the cathode current IK, the signal current Is, and the control electrode current IG, and accordingly, even though the amount of the incident light causes the changes of the signal current IS, the amount of the excess beam current IR is controlled to be a constant value by controlling the control electrode current IG.

In the circuit block diagram as shown in FIG. 1, the output signal ER from the subtractor 11 corresponds to the excess beam current IR.

If an amplification factor of the comparator 12, and a resistance of the resistor 9 are expressed as A and R, respectively, then following equation is established.

$$A \times (IO - IR) = \frac{EG}{R} \quad (5)$$

Therefore, the excess beam current is also expressed as $$IR = \frac{A \times R \times Gm}{\alpha + A \times R \times Gm} \times IO - \frac{A \times R \times Gm}{\alpha + A \times R \times Gm} \times IS - \frac{IG}{\alpha + A \times R \times Gm} \tag{6}$$

As the value of AxRxGm shows a certain finite value, the excess beam current IR is always smaller than the reference current IO.

It will be apparent to those skilled in the art that many modifications and variations may be effected without departing from the spirit and scope of the novel concepts of the present invention.

I claim as my invention:

1. A beam current control circuit for a pick-up tube which operates with higher control electrode potential than cathode electrode potential, comprising: means for controlling said control electrode potential in response to signals corresponding to the difference between an excess beam current and a reference signal, and means for generating signals corresponding to said excess beam current based on a signal current, a cathode current and a control electrode current of said pick-up tube.

2. A beam current control circuit as set forth in claim 2, wherein said signal generating means includes means for subtracting signals corresponding to said control electrode current and said signal current out of a signal corresponding to said cathode current.

3. A beam current control circuit as set forth in claim 2, wherein said control means includes a transistor interposed between a control electrode and a reference potential, and said difference signal being supplied to a base electrode of said transistor.

* * * * *